(12) United States Patent
Paternoster et al.

(10) Patent No.: US 9,803,077 B2
(45) Date of Patent: Oct. 31, 2017

(54) CAST-MOLDED ARTICLE (71) Applicant: Schock GmbH, Regen (DE)

(72) Inventors: Rudolf Paternoster, Rinchnach (DE); Xaver Pledl, Zwiesel (DE)

(73) Assignee: SCHOCK GMBH, Regen (DE)

( * ) Notice: Subject to any disclaimer, the term of this patent is extended or adjusted under 35 U.S.C. 154(b) by 0 days.

(21) Appl. No.: 15/258,277

(22) Filed: Sep. 7, 2016

(65) Prior Publication Data

US 2017/0081511 A1    Mar. 23, 2017

(30) Foreign Application Priority Data

Sep. 18, 2015 (DE) .................. 10 2015 115 769

(51) Int. Cl.
| | |
|---|---|
| C08L 33/12 | (2006.01) |
| B29B 15/08 | (2006.01) |
| C08K 7/02 | (2006.01) |
| B29C 39/00 | (2006.01) |
| B29C 39/02 | (2006.01) |
| B29C 70/64 | (2006.01) |
| B29C 43/00 | (2006.01) |
| B29K 33/00 | (2006.01) |
| E03C 1/18 | (2006.01) |
| B29K 277/00 | (2006.01) |
| B29K 105/12 | (2006.01) |
| B29K 105/16 | (2006.01) |

(Continued)

(52) U.S. Cl.
CPC .............. *C08L 33/12* (2013.01); *B29B 15/08* (2013.01); *B29C 39/006* (2013.01); *B29C 39/02* (2013.01); *B29C 43/003* (2013.01); *B29C 70/64* (2013.01); *B29K 2033/12* (2013.01); *B29K 2105/12* (2013.01); *B29K 2105/16* (2013.01); *B29K 2277/00* (2013.01); *B29K 2509/00* (2013.01); *B29K 2995/0077* (2013.01); *B29K 2995/0089* (2013.01); *B29L 2031/7698* (2013.01); *E03C 1/18* (2013.01)

(58) Field of Classification Search
CPC ............ C08L 33/12; B29B 15/08; C08K 7/02
See application file for complete search history.

(56) References Cited

U.S. PATENT DOCUMENTS 4,107,135 A * 8/1978 Duggins et al. ........ C08L 57/00
523/451
8,853,300 B2   10/2014 Reichenberger et al.
9,080,321 B2   7/2015 Paternoster et al.

FOREIGN PATENT DOCUMENTS

DE    2718024 C2    4/1987
DE    3853920 T2   10/1995
(Continued)

OTHER PUBLICATIONS

Jackson et al. Fire and Materials, vol. 2, No. 1, 1978, pp. 37-38.*
(Continued)

*Primary Examiner* — Vu A Nguyen
(74) *Attorney, Agent, or Firm* — Lucas & Mercanti, LLP (57) ABSTRACT

A cast-molded article in a composite material comprising a cured polymeric binder incorporating embedded particles of filler, characterized in that the binder incorporates randomly distributed fibers of polyamide, wherein the fibers have a length of 5-20 mm and a diameter of 0.05-0.2 mm and the fibers comprise 0.02-0.5 wt % based on the overall mass of the cast-molded article.

44 Claims, 6 Drawing Sheets

(51) Int. Cl.
    B29K 509/00    (2006.01)
    B29L 31/00     (2006.01)

(56)         References Cited

FOREIGN PATENT DOCUMENTS

DE      4313924 C2         7/2002
DE      102004055365 A1    5/2006
DE      102010046627 A1    3/2012
EP      0361101 A1         4/1990

OTHER PUBLICATIONS

Wikipedia entry "Ultimate Tensile Strength", downloaded Mar. 31, 2017.*
European Search Report for Application No. 16182700.1-1706 dated Feb. 14, 2017 (9 pages).

* cited by examiner

Results for impact strength measurement to DIN 53448 in mJ/mm$^2$
nylon-6; surface untreated

|   | Fiber: ⌀ L in mm | Amount used in wt% | | | |
|---|---|---|---|---|---|
|   |   | 0.05 | 0.1 | 0.2 | 0.4 |
| a | 0.075/5 | 1.95 | 2 | 1.99 | 1.75 |
| b | 0.1/5 | 2 | 1.95 | 1.9 | 1.75 |
| c | 0.15/5 | 1.9 | 1.9 | 1.85 | 1.75 |
| d | 0.2/5 | 1.9 | 1.91 | 1.83 | 1.68 |
| e | 0.075/10 | 2.1 | 2.21 | 2.35 | 2.4 |
| f | 0.1/10 | 2.05 | 2.07 | 2.21 | 2.17 |
| g | 0.15/10 | 2 | 1.95 | 2 | 1.92 |
| h | 0.2/10 | 1.95 | 1.97 | 1.94 | 1.84 |
| i | 0.075/20 | 2.15 | 2.32 | neg. | neg. |
| j | 0.1/20 | 2.25 | 2.29 | 2.17 | neg. |
| k | 0.15/20 | 2.24 | 2.3 | 2.24 | 2 |
| l | 0.2/20 | 2.3 | 2.37 | 1.82 | 1.73 | impact strength of specimen sans fibers:    1.98mJ/mm$^2$
neg. = no test-piece article obtainable

FIG. 4

Results for visibility at the surface by visual inspection
nylon-6; surface untreated

|   | Fiber: ⌀ L in mm | Amount used in wt% | | | |
|---|---|---|---|---|---|
|   |   | 0.05 | 0.1 | 0.2 | 0.4 |
| a | 0.075/5 | 0 | 0 | 0 | 0 |
| b | 0.1/5 | 0 | 0 | 0 | 0 |
| c | 0.15/5 | 0 | 0 | 0 | 0 |
| d | 0.2/5 | 0 | 0 | 0 | 0 |
| e | 0.075/10 | 0 | 1 | 1 | 1 |
| f | 0.1/10 | 0 | 0 | 0 | 1 |
| g | 0.15/10 | 0 | 0 | 0 | 0 |
| h | 0.2/10 | 0 | 0 | 0 | 0 |
| i | 0.075/20 | 1 | 1 | neg. | neg. |
| j | 0.1/20 | 0 | 1 | 1 | neg. |
| k | 0.15/20 | 0 | 1 | 1 | 1 |
| l | 0.2/20 | 1 | 1 | 1 | 1 | neg. = no test-piece article obtainable

FIG. 5

Results for impact strength measurement to DIN 53448 in mJ/mm²
nylon-6; surface plasma activated

|   | Fiber: ⌀ L in mm | Amount used in wt% | | | |
|---|---|---|---|---|---|
|   |   | 0.05 | 0.1 | 0.2 | 0.4 |
| a | 0.075/5 | 1.95 | 2.2 | 2.35 | 2.1 |
| b | 0.1/5 | 2 | 2.3 | 2.25 | 1.9 |
| c | 0.15/5 | 2.1 | 2.4 | 2.1 | 1.85 |
| d | 0.2/5 | 2 | 1.95 | 1.85 | 1.8 |
|   |   |   |   |   |   |
| e | 0.075/10 | 2.2 | 2.5 | 2.65 | 2.9 |
| f | 0.1/10 | 2.28 | 2.78 | 2.65 | 3.05 |
| g | 0.15/10 | 2.31 | 2.75 | 2.83 | 2.62 |
| h | 0.2/10 | 2.23 | 2.35 | 2.41 | 2.23 |
|   |   |   |   |   |   |
| i | 0.075/20 | 2.3 | 2.41 | neg. | neg. |
| j | 0.1/20 | 2.32 | 2.4 | 2.53 | neg. |
| k | 0.15/20 | 2.3 | 2.6 | 2.7 | 2.75 |
| l | 0.2/20 | 2.4 | 2.65 | 2.83 | 2.8 | impact strength of specimen sans fibers:   1.98mJ/mm²
neg. = no test-piece article obtainable

FIG. 6

Results for visibility at the surface by visual inspection
nylon-6; surface plasma treated

|   | Fiber: ⌀ L in mm | Amount used in wt% | | | |
|---|---|---|---|---|---|
|   |   | 0.05 | 0.1 | 0.2 | 0.4 |
| a | 0.075/5 | 0 | 0 | 0 | 0 |
| b | 0.1/5 | 0 | 0 | 0 | 0 |
| c | 0.15/5 | 0 | 0 | 0 | 0 |
| d | 0.2/5 | 0 | 0 | 0 | 0 |
| e | 0.075/10 | 0 | 1 | 1 | 1 |
| f | 0.1/10 | 0 | 0 | 0 | 1 |
| g | 0.15/10 | 0 | 0 | 0 | 0 |
| h | 0.2/10 | 0 | 0 | 0 | 0 |
| i | 0.075/20 | 1 | 1 | neg. | neg. |
| j | 0.1/20 | 0 | 1 | 1 | neg. |
| k | 0.15/20 | 0 | 1 | 1 | 1 |
| l | 0.2/20 | 1 | 1 | 1 | 1 | neg. = no test-piece article obtainable

FIG. 7

Results for rheology to DIN EN ISO 3219 in mPas
nylon-6; surface untreated

|   | Fiber: ⌀ L in mm | Amount used in wt% | | | | |
|---|---|---|---|---|---|---|
|   |   | 0 | 0.05 | 0.1 | 0.2 | 0.4 |
| a | 0.075/5 | 5500 | 5800 | 6300 | 6700 | 7400 |
| b | 0.1/5 | 5500 | 5600 | 6300 | 6500 | 7100 |
| c | 0.15/5 | 5500 | 5600 | 6200 | 6400 | 8500 |
| d | 0.2/5 | 5500 | 5500 | 5800 | 6600 | 6800 |
|   |   |   |   |   |   |   |
| e | 0.075/10 | 5500 | 7300 | 9600 | 11200 | 14500 |
| f | 0.1/10 | 5500 | 6600 | 6600 | 7100 | 10100 |
| g | 0.15/10 | 5500 | 5900 | 6000 | 6300 | 6900 |
| h | 0.2/10 | 5500 | 5500 | 5700 | 5900 | 6900 |
|   |   |   |   |   |   |   |
| i | 0.075/20 | 5500 | 7500 | 8800 | 10000 | 18000 |
| j | 0.1/20 | 5500 | 7100 | 8300 | 9500 | 15800 |
| k | 0.15/20 | 5500 | 6300 | 7700 | 8300 | 9800 |
| l | 0.2/20 | 5500 | 5800 | 6500 | 7500 | 9400 |

CAST-MOLDED ARTICLE

CROSS-REFERENCE TO RELATED APPLICATIONS

The present application claims priority of DE 10 2015 115 769.1, filed Sep. 18, 2015, the priority of this application is hereby claimed and this application is incorporated herein by reference.

BACKGROUND OF THE INVENTION

The invention relates to a cast-molded article in a composite material comprising a cured polymeric binder incorporating embedded particles of filler.

Cast-molded articles of this type are known in the form of kitchen sinks, wash-basins, worktops or shower trays for example. They are produced in a casting process, for example as described in EP 0 361 101 A1. They combine high visual appeal with very good performance characteristics, particularly with regard to abrasion resistance and scratch resistance.

Such a cast-molded part, for example in the form of a kitchen sink, typically has a face side and a reverse side and is a component part with a relatively large surface area. It typically contains a relatively high level of filler particles embedded in the polymeric matrix of binder. This embrittles the material to a certain extent, particularly when the binder has a high proportion of crosslinker, for example as disclosed in DE 10 2004 055 365 A1. Since its typical use may well expose such a molded article to mechanical or thermal stressors, the brittleness of the material and hence its reduced level of impact strength may, in the extreme case, result in some cracking; that is, there is a certain susceptibility to cracking in the event of the cast-molded article being exposed to a severe stress on the face side surface in particular. Such a severe stress may take the form, for example, of thermal stresses induced by the placing of a very hot pot onto the cold surface, or of an impact stress due to a falling object or the like.

SUMMARY OF THE INVENTION

The problem addressed by the invention is accordingly that of devising a cast-molded article having improved resistance to cracking.

The problem is solved according to the invention when a cast-molded article of the type referred to at the outset is characterized in that the binder incorporates randomly distributed fibers of polyamide, wherein the fibers have a length of 5-20 mm and a diameter of 0.05-0.2 mm and the fibers comprise 0.02-0.5 wt % based on the overall mass of the molded article.

The invention proposes the integration of polyamide fibers into the binder matrix in order to endow the cast-molded article with an increased level of impact strength and hence an improved resistance to cracking. The DIN 53448 impact strength is a typical technical indicator of this resistance. Crucially, the casting composition needed for the corresponding cast article retains the particular required processability, i.e., pourability/flowability. To this end, the binder matrix of a cast-molded article according to the present invention incorporates randomly distributed polyamide fibers. While the thickness of the cast-molded article may vary from point to point, the distribution of the polyamide fibers in the article is random, but preferably substantially homogeneous. A main alignment of the fibers is preferably but not mandatorily parallel to a face side of the cast-molded article. A "main alignment" of this type is to be understood in the present invention as meaning that the elongate fibers are incorporated in the binder matrix such that they extend essentially parallel to the face side, although this must of course not be understood as an absolute parallelity, but also as a slightly angled alignment relative to the visible face plane, meaning that they may even have an orientation at a flat angle relative to the visible face plane. Their angle relative to the visible face plane is not comparatively large, which is to be understood as not even an angle 15°. What is absolutely not the case is that the fibers are relatively steep or even substantially perpendicular to the visible face plane. As a result, the binder matrix is provided a fiber reinforcement which is substantially homogeneous, yet in an approximately parallel alignment and distribution relative to the areally large, but relatively thin component part.

The fibers used are polyamide fibers, which are particularly notable for adequate strength and stiffness. Preferably but not mandatorily, the polyamide fibers to be used have a breaking strength of not less than 250 N/mm$^2$, which in combination with their firm attachment in the binder matrix and their above-described main alignment ensures a high level of impact strength.

The definition of the fibers' geometry is sufficient to guarantee good results. The fibers should have a length of 5-20 mm and a diameter of 0.05-0.2 mm. It has been determined that fibers having these dimensions not only incorporate readily into the binder matrix but also, by virtue of their random yet somewhat directed distribution (due to the main alignment), ensure good and defined dispersal throughout the matrix. Shorter fibers cannot be adequately bonded into the binder matrix, while excessively long fibers can lead to some entanglement. Fibers having a diameter less than the lower limit specified present issues in processability, namely an excessive viscosity on using the amount needed to raise the impact strength to a sufficient degree. Fibers having a diameter larger than the upper limit specified need to be disproportionately long to ensure adequate adherence in the binder matrix for the same amount used, in turn reducing the processability owing to the worse workability of the casting composition due to, for example, entanglement. As the cross-sectional area of the fiber decreases, its surface area increases disproportionately for a given length of fiber, and vice versa.

The fibers should comprise between 0.02-0.5 wt % of the overall mass of the molded article. Adding too little fiber does not lead to any significant improvement in properties, particularly when relatively short fibers are used, while an admixture of excessive fiber is disadvantageous with regard to the rheological properties of the casting composition, rendering it excessively viscous and no longer properly processable, particularly when using longer thin fibers. Excessive fiber can further lead to increased microstructural dislocations.

Incorporating polyamide fibers having the appropriate geometric and also mechanical properties in the quantitative range specified while choosing the admixed fibers and fiber quantity according to their length and diameter so as to obtain a processable casting composition and visually impeccable moldings gives cast-molded articles which, compared with cast-molded articles sans added fiber, have distinctly improved properties with regard to impact strength, and so are distinctly less susceptible to cracking under a corresponding mechanical or thermal stress, while the other properties of the cast-molded article which result from the polymeric binder and the included particles of filler remain the same and/or are not affected by the incorporated fibers.

The polyamide fibers used are preferably fibers of nylon-6 or nylon-6,6. Either nylon has a high melting point of above 200° C., which is important with regard to the cast-molded article being exposed to a thermal stress. They also have a sufficiently high breaking strength and/or a sufficiently high tensile strength, and are very useful for fibrous reinforcement.

In further particularization, the fibers should have a length of 7-15 mm, in particular of 8-12 mm and more preferably of 10 mm. Especially fibers from this length range gave very good impact strength values, they bond efficiently and firmly into the binder matrix without any issues resulting due to entanglement or a visible surface being defective owing to excessive viscosity. A contributory factor to this is that the fibers should in further development of the invention have a diameter of 0.075-0.175 mm, in particular of 0.1-0.15 mm. Fibers having this diameter are sufficiently strong yet still have a sufficiently large surface area for firm attachment into the binder matrix.

In further particularization of the invention, the fibers should comprise 0.025-0.25 wt %, preferably 0.03-0.2 wt % and particularly 0.05-0.15 wt % based on the overall mass of the cast-molded article.

The fibers themselves may be colored or colorless, and if colored their coloration preferably matches that of the filler particles, which may be self-colored, pigmented or color-coated, and/or the colored pigmentation of the binder of the cast article.

A further development of the invention may provide that an edge region adjoining the face side of the cast-molded article is fiberless and it is only in the remaining volume of the article that the fibers are present in the form of a dispersion. It has been determined that usage of fibers of the specified type in the specified amount of addition results in the formation, on the face side of the molded article, of an albeit very thin edge region containing a negligible number of fibers, if any. Since but relatively short and thin fibers are used, this is attributable to a slow process of sedimentation wherein the minimally heavier fillers in the casting mold, which is virtually standing on its head, so the face side is down, accumulate—minimally—at the mold surface to form the extremely thin edge region. This process of sedimentation is slow not least because of the viscosity of the casting composition and/or polymer matrix.

As noted, the fibers form a homogeneous dispersion away from any very thin, above-described edge region. This means that even as the casting composition has been prepared, care must be taken to ensure that the fibers form a homogeneous distribution in the viscid casting composition so a homogeneous distribution also results in connection with the establishment of the main alignment as the casting composition is filled into the casting mold, and necessarily also becomes established in the final cast-molded article.

To confer improved impact strength on the cast-molded article, the strength of the bond holding the fibers in the binder matrix should advantageously be as high as possible. In a particularly advantageous embodiment, therefore, the fibers attach to the binder via surficial reactive groups. These surficial reactive groups are obtainable by subjecting just the fiber to an appropriate plasma treatment. Chemical bonds on the polyamide fiber are broken apart by energy from the plasma. These open bonds are capable of reacting with the binder. It is also possible to use the plasma to add further chemically functional groups onto the polyamide fibers. In either case, this surficial activation causes the polyamide fibers to become attached to the binder by a very strong bond. This provides a very much improved impact strength in combination with a high breaking or tensile strength on the part of the polyamide fibers.

In a possible alternative embodiment to activation via a plasma, the fibers have a coating of adhesion promoter attaching them to the binder. The adhesion promoter used may be selected according to the type of binder used. Ultimately, the adhesion promoter likewise has the purpose to attach the polyamide fiber to the binder by chemical bonding.

The binder itself comprises a monomer and a polymer dissolved in said monomer. The monomers used may be, in particular, styrene, acrylic acid or methacrylic acid, acrylic ester and/or methacrylic ester, whereto the corresponding polymers are added to form the binder solution. The binder solution preferably includes a mixture of methyl methacrylate and poly(methyl methacrylate), wherein said poly(methyl methacrylate) may be a copolymer formed from methyl methacrylate, butyl methacrylate or the like. The proportion of the reaction composition which is accounted for by the binder solution should be between 10-45 wt %, in particular between 15-40 wt % and preferably between 20-35 wt %. These percentages do not account for any crosslinker admixed to the binder solution.

The ratio of the proportional parts by weight of polymer to monomer is preferably between 1:1 and 1:10, in particular between 1:2 and 1:7 and preferably between 1:3 and 1:5. When methyl methacrylate (MMA) is used as monomer and poly(methyl methacrylate) (PMMA) as polymer, for example, the mass fraction of the MMA-PMMA binder solution which is accounted for by PMMA should be between 15-30%, the mass fraction of the molded part which is accounted for by the MMA should be between 15-25%, in particular between 18 and 23%, while the fraction of the molded part mass which is accounted for by the PMMA is between 3 and 8%, in particular between 4 and 6%.

The binder may further comprise a crosslinker, at a weight fraction of not less than 0.2% based on the mass of the molded part. The crosslinker fraction may also be relatively high, for example not less than 10 wt % based on the fraction of monomer in the binder solution, preferably more than 15% and particularly between 20-30 wt %.

The crosslinker may comprise a di- or polyfunctional monomer or polymer, in particular a di- or polyfunctional acrylate or polyacrylate, preferably ethylene glycol dimethacrylate, trimethylolpropane trimethacrylate or pentaerythritol triacrylate. The crosslinker may also comprise a combination of two or more individually di- or polyfunctional monomers or polymers, in particular of the type described above. The crosslinker, which preferably polymerizes faster than the polymerized solution of binder, forms a uniform distribution in the reaction composition, therefore the latter will polymerize uniformly.

As described, the polymer matrix of the cast-molded article includes filler particles. The mass fraction of the filler particles should be between 40-85%, in particular between 60-80% and preferably between 65-75%, based on the mass of the cast-molded article. The filler particles used should have a higher Mohs hardness than the binder. This makes it possible to use the choice of filler particles to determine—or at any rate substantially influence—the mechanical properties, particularly the abrasion resistance of the molded article obtained. Preferably more than 50 wt % and more preferably more than 75 wt % of the filler particles have a Mohs hardness of not less than 6, in particular of not less than 7.

Particularly quartz sand, silicon dioxide, silicon carbide, glass, alumina or carbon in the diamond allotrope are usable for this purpose as inorganic types of filler particles. It is also conceivable to admix calcium carbonate, although the Mohs hardness of calcium carbonate is just 3-4. The filler particles should each be between 0.01 mm and 1 mm in size. Preferably, the particle size should be between 0.05-0.3 mm. In principle, filler particles in two or more different size fractions may be used.

Preference is given to employing naturally derived quartz sands and also meals formed from quartz and their polymorphs. Quartz sands of this type are advantageous when they have a high level of chemical purity and, in particular, a low iron oxide content.

As already noted, it is primarily the filler particles which are responsible for the coloring of the casting or reaction composition and/or of the cast-molded article. They may have an inherent color that is color determining. Alternatively, they may also be pigmented or color coated. However, upon requirement of a masstone color that cannot be established via the filler particle coloration, color pigments may conceivably be admixed to the casting composition. The color pigments, which preferably have a uniform state of subdivision, may be inorganic in type, but it is also possible to use organic-based color pigments. Alternatively, or additionally, luster particles may also be admixed to impart a metallic luster to the cast-molded article.

The cast-molded article itself is preferably a sink, in particular a kitchen sink. But it may also be a wash-basin or a shower tray, or a kitchen worktop or the like.

In addition to the cast-molded article itself, the invention further provides a process for producing a cast-molded article of the type described. This process is characterized in that not only filler particles but also polyamide fibers having a length of 5-20 mm and preferably a diameter of 0.05-0.2 mm are mixed into a curable polymeric solution of a binder to form a homogeneous casting composition wherein the fibers comprise 0.02-0.5 wt % based on the overall mass of the casting composition and then the casting composition is poured into a casting mold wherefrom the cast-molded article is demolded after the binder has cured. Preferably, the fibers used should have a breaking strength of not less than 250 N/mm$^2$.

The fibers used are preferably fibers of nylon-6 or nylon-6,6. The length of the fibers used should be between 7-15 mm, in particular 8-12 mm and more preferably 10 mm, while the diameter should be between 0.075-0.175 mm, in particular 0.1-0.15 mm.

In further particularization, the admixed proportion of fibers comprises 0.025-0.25 wt %, preferably 0.03-0.2 wt %, in particular 0.05-0.15 wt % based on the overall mass of the casting composition.

It is further possible, in one embodiment, to use colorless fibers, i.e., fibers that are ultimately devoid of any significant inherent color. Alternatively, it is also possible to use fibers that do have an inherent color, in which case the fiber color matches the color of the cast-molded article's inherent coloration.

Particular preference is given to using fibers that have been plasma treated on the surface to form reactive groups or that have a coating of adhesion promoter. This ensures that the bonding of the fibers into the binder matrix is particularly strong, since what attaches them to the binder is chemical bonding by the reactive groups or the adhesion promoter.

The binder used is a solution formed from a monomer and a polymer dissolved in said monomer and preferably a crosslinker. Preferably, the monomer used is methyl methacrylate (MMA), the polymer used is poly(methyl methacrylate) (PMMA) and the crosslinker optionally added is trimethylolpropane trimethacrylate (TRIM).

Regarding further process features concerning the fibers, monomers, polymers, crosslinkers, fillers or pigments used, the above disclosures regarding the cast-molded article itself are referenced because they are also similarly relevant to the process.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
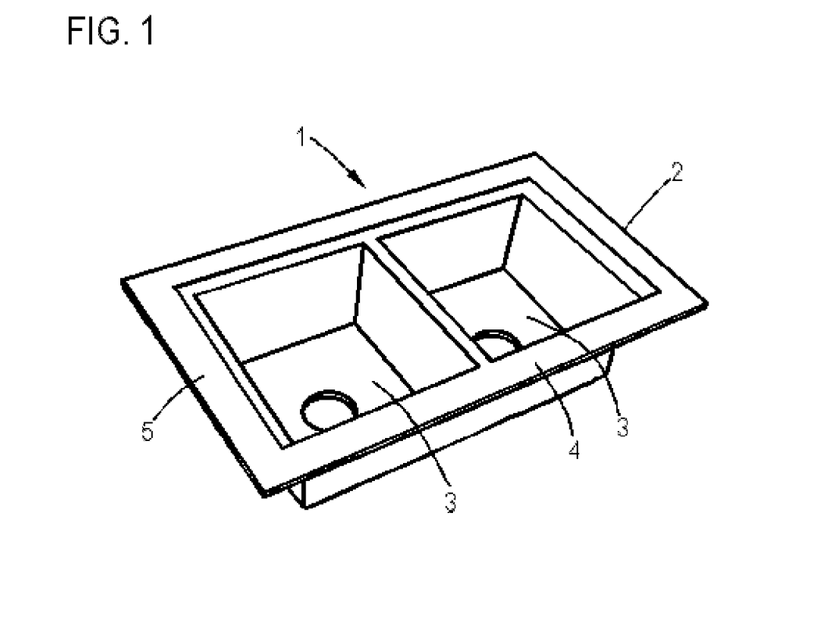
FIG. 1 shows a perspective view in the form of an in-principle depiction of a cast-molded article obtained according to the invention in the form of a kitchen sink.

FIG. 1 shows at 1 a perspective view of a cast-molded article as classified in the preamble, namely a cast-molded article in a composite material comprising a cured polymeric binder incorporating embedded particles of filler.

The illustrated example is a kitchen sink 2 having, for the purposes of this example, two separate bowls 3, each bounded by sidewalls and a bottom surface. The upper rim 4 is continuous and relatively wide. The cast-molded article 1 has a face side 5, i.e., a surface that is visible in the installed position. This face side extends to all surfaces on the front, not only in the region of bowls 3 but also in the region of rim 4.

The cast-molded article is produced using a closed casting mold whereinto the reaction composition, i.e., the casting composition, containing inter alia the polymeric binder and/or the binder solution and filler particles included therein and also—in the example which is in accordance with the present invention—introduced polyamide fibers is introduced. The casting composition has an adequate viscosity for filling into the casting mold. Inside the casting mold, the introduced casting composition is heated, using externally supplied energy, to effect polymerization and hence to cure the polymeric binder. The polymeric binder used is a corresponding binder solution, preferably of MMA as monomer and PMMA as polymer. The mass fraction of the MMA-PMMA solution which is attributable to the PMMA is preferably between 15-30%, while in general the ratio of the proportional parts by weight of the polymer to the monomer in the binder solution should be between 1:1 and 1:10, in particular between 1:2 and 1:7 and preferably between 1:3 and 1:5. The binder solution is preferably admixed with a crosslinker, preferably trimethylolpropane trimethacrylate (TRIM). The proportion of crosslinker may be below 10 wt % of the monomer fraction of the binder solution. However, it may also be preferable for it to be more than 10 wt %, preferably between 10-30 wt %, based on the monomer fraction in the binder solution.

As described, the casting composition further includes filler particles, the level of the preferably inorganic types of filler particles being between 55-85 wt %, preferably between 60-80 wt % and particularly between 65 and 75 wt %, based on the reaction composition. Preference is given to using mineral inorganic fillers, in particular crystalline fillers, for example quartz sand. Alternatively, it is also possible to use glass, silicon carbide, alumina or carbon in the diamond allotrope or calcium carbonate. The filler particles should be between 0.01-1 mm in size and may optionally be present in different, distinguishable size fractions.

The polyamide fibers admixed should have a length of 5-20 mm, in particular of 7-15 mm, particularly of 8-12 mm and more preferably of 10 mm, and a diameter of 0.05-0.2 mm, in particular of 0.075-0.175 mm, preferably of 0.1-0.15 mm. Their proportion should be between 0.02-0.5 wt % based on the overall mass of the casting composition, preferably between 0.025-0.3 wt %, in particular between 0.03-0.2 wt % and more preferably between 0.05-0.15 wt %, based on the overall mass of the casting composition (or of the molded article in its cured state).

It is preferably nylon-6 or nylon-6,6 fibers which are used. The fibers used should have a breaking strength of not less than 250 N/mm$^2$.

Figure 2:
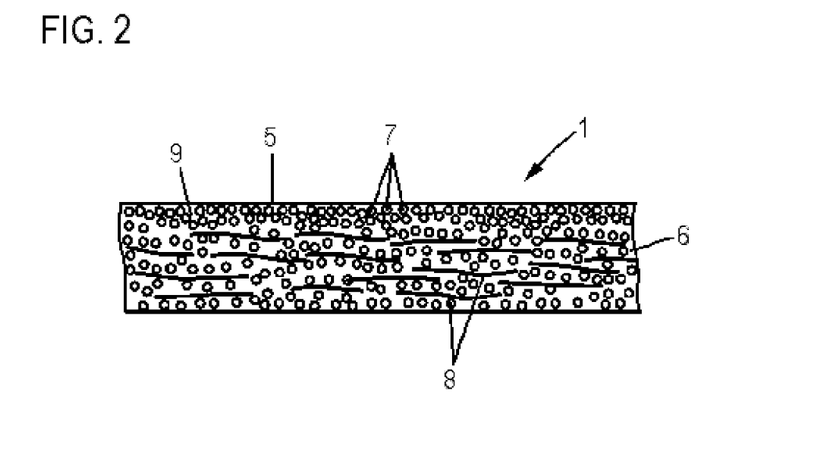
FIG. 2 shows an in-principle depiction of a sectional view through the cast-molded article of FIG. 1.

FIG. 2 shows an in-principle depiction of a sectional view through the rim 4 of the cast-molded article 1 in FIG. 1. The thickness of the corresponding sections of the cast-molded article is typically between 5-15 mm.

FIG. 2 shows firstly the cured polymeric binder 6, i.e., the binder matrix. This binder matrix incorporates the filler particles 7 in a substantially homogeneous distribution. The binder 6 similarly incorporates the polyamide fibers 8. Their main alignment, as shown by FIG. 2, is preferably essentially parallel to the face side 5 of the cast-molded article 1; that is, they extend approximately parallel thereto. This is to be understood as meaning that the angle formed by fibers—or, for example, an approximated straight line placed against the particular polyamide fiber 8—with the plane of the face side 5 is preferably below 15°, more preferably below 10° and yet more preferably below 5°. The polyamide fibers 8, as will be appreciated, do not just extend parallel to the plane of the drawing, but are at arbitrary angles to the same plane, i.e., they also extend into and out of the plane of the drawing. However, their primary, main alignment is determined by the local direction of flow of the casting composition within the casting mold.

The final cast-molded article develops an edge region 9 directly adjoining the face side 5, this edge region 9 being very narrow at a width in the range of 0.1-2 mm and fiberless. This edge region 9 is only formed of the cured binder 6 and the filler particles 7. Since, therefore, no polyamide fibers 8 are present on the edge region side, they are logically also not visible on the face side 5. This edge region develops on using sufficiently thin and long fibers having the dimensions described above and choosing the fiber fraction as a proportion of the overall mass of the casting composition in the manner described.

Figure 3:
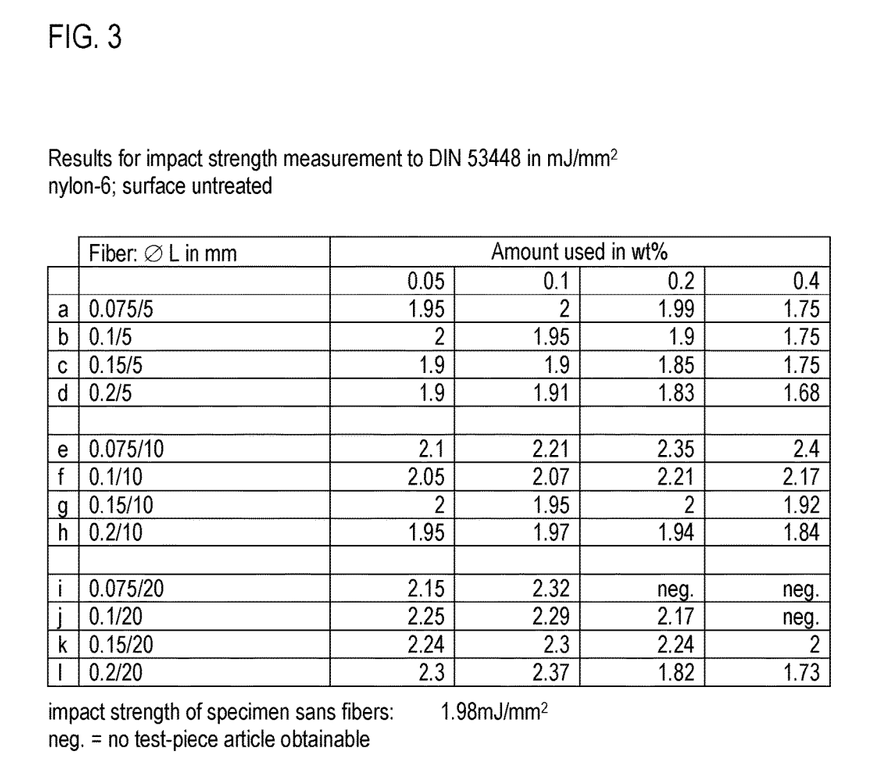
FIG. 3 shows a table including impact strength measurements regarding a fiberless, comparative test-piece article and 48 test-piece articles comprising different admixtures of fibers, said fibers not having been surface treated.
Figure 5:
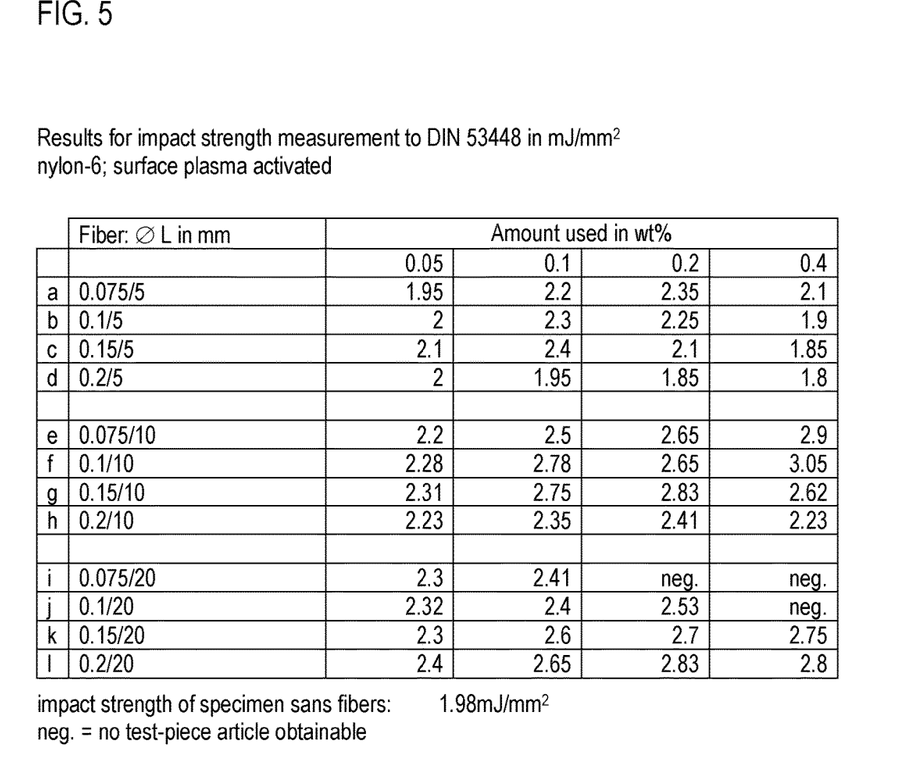
FIG. 5 shows a table featuring impact strength measurements for the fiberless, comparative test-piece article and 48 test-piece articles comprising different admixtures of fibers, said fibers having been surface activated via a plasma.
Figure 6:
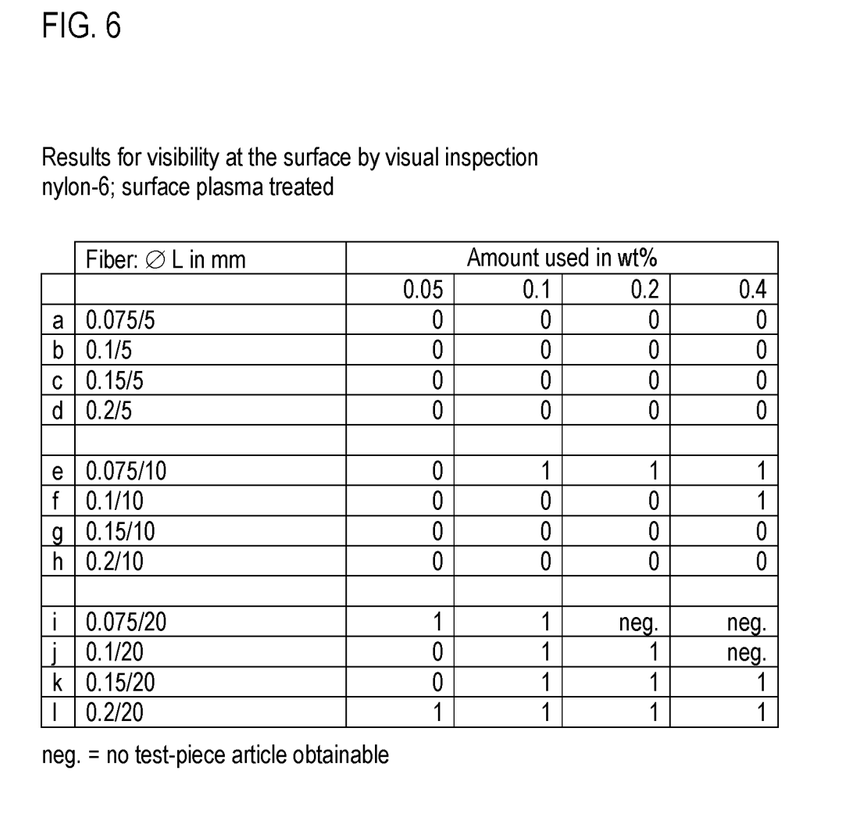
FIG. 6 shows a table featuring results of a visual inspection of the visible surface of the test-piece articles according to the above tables of FIG. 5.
Figure 7:
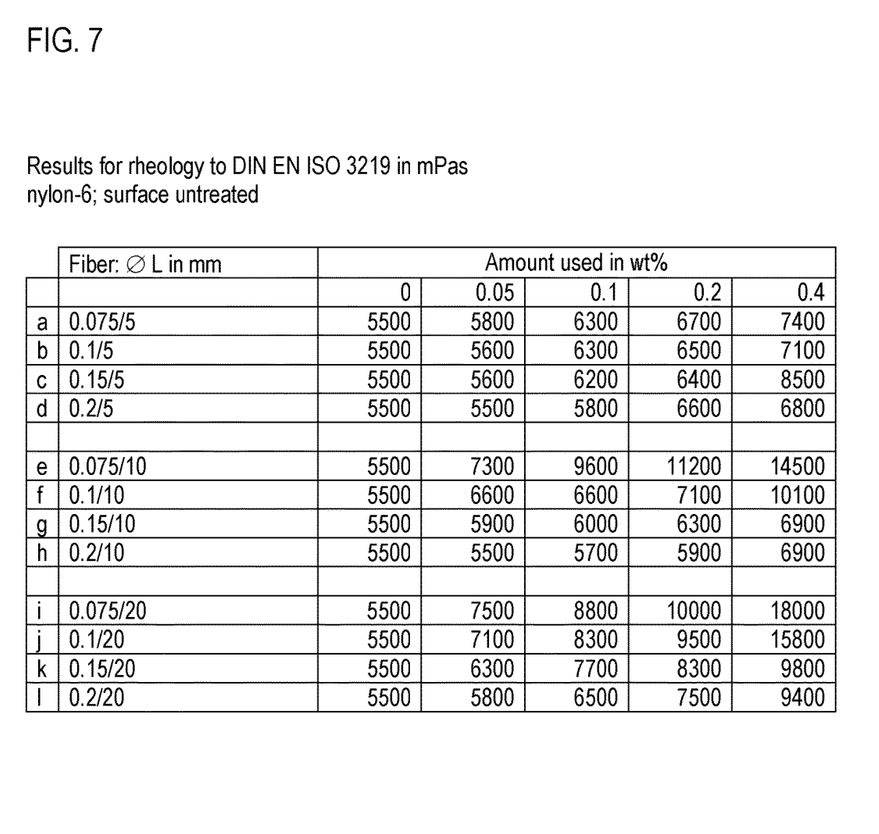
FIG. 7 shows a table concerning rheology measurements regarding the casting compositions used to produce the test-piece articles of FIG. 3.

The tables shown in FIGS. 3-6 show impact strength measurements (FIGS. 3 and 5) and results of a visual inspection of the visible surface (FIGS. 4 and 6) of altogether 96 different test-piece articles and/or 96 different casting compositions and one comparative test-piece article and/or casting composition, while FIG. 7 shows rheology measurements for the test-piece articles in FIG. 3 and for the comparative test-piece article.

The casting compositions produced were all the same with regard to the binder solution, the filler particles, the crosslinker and any additives etc., merely the type and amount of the polyamide fibers admixed varied from casting composition to casting composition and/or from test-piece article to test-piece article.

The casting compositions produced were as follows, although the table hereinbelow does not include the particular specific admixtures of fiber:

| Material | Amount used (wt %) |
| --- | --- |
| MMA | about 19.1 |
| PMMA | about 4.6 |
| filler 1 (quartz sand 0.05-0.3 mm) | about 52 |
| filler 2 (cristobalite meal 0.01-0.05 mm) | about 18 |
| crosslinker (TRIM) | about 4.2 |
| additives, peroxide, pigment | about 2.1 |
| SUM TOTAL: | 100 |

The molded articles identified in FIGS. 3-6 as a-l, or to be more precise their casting compositions, were each admixed with different fibers, said fibers differing in diameter and also length.

The casting compositions and/or the test-piece articles a-d were admixed with fibers 5 mm in length and respectively 0.075 mm, 0.1 mm, 0.15 mm and 0.2 mm in diameter.

The casting compositions and/or the test-piece articles e-h were admixed with fibers 10 mm in length and respectively 0.075 mm, 0.1 mm, 0.15 mm and 0.2 mm in diameter.

The casting compositions and/or the test-piece articles i-l were finally admixed with fibers 20 mm in length and respectively 0.075 mm, 0.1 mm, 0.15 mm and 0.2 mm in diameter.

In addition, within each casting composition or test-piece article group a-d, e-h or i-l, the particular amount of fiber admixed varied as shown in the columns of the tables shown in FIGS. 3 and 5 (amount used in wt %).

The first group of casting compositions or test-piece articles were admixed with a fiber quantity of 0.05 wt % based on the overall mass of the casting composition. A second group of casting compounds or test-piece articles were admixed with a fiber quantity of 0.1 wt % based on the overall mass of the molded article. A third group of casting compounds or test-piece articles were admixed with a fiber quantity of 0.2 wt % based on the overall mass of the molded article. A fourth group of casting compounds or test-piece articles were finally admixed with a fiber quantity of 0.4 wt % based on the overall mass of the casting compound.

Altogether 48 casting compounds were prepared in this way, giving 12 test-piece articles differing in fiber type and four different levels of fiber admixture. Fiber admixture raised the viscosity of the particular casting composition, the increase in some cases being so considerable as to render the casting composition unprocessable, i.e., uncastable. Not all casting composition batches could therefore be converted into test-piece articles. The batches whence no test-piece articles were obtained are identified in the tables of FIGS. 3 and 5 as "neg.".

In addition, one test-piece article was produced for comparison from purely the casting compound sans fiber admixture.

The values measured in a DIN 53448 impact strength measurement are reported in mJ/mm$^2$ in FIGS. 3 and 5. The a-l test-piece articles produced from the respective casting compositions and tested were DIN-compliant. The impact strength measurements were carried out using an HIT5P pendulum impact tester from Zwick/Roell.

The fibers admixed to the casting compositions leading to the test-piece articles tested as per FIG. 3 had not been given a surface treatment; that is, they were nylon-6 fibers neither having surfaces activated by a plasma treatment nor having surfaces coated with an adhesion promoter.

The comparative test-piece article produced from the casting composition sans fiber admixture gives an impact strength measurement of 1.98 mJ/mm$^2$.

The measured values shown in the table of FIG. 3 exhibit an improvement, i.e., increase, in impact strength on using the fibers without surface treatment, particularly in the case of the comparatively long fibers, i.e., the fibers 10 mm or 20 mm in length, and an admixed fiber quantity of 0.05 or 0.1 wt %, only in some instances also at higher admixtures. A fiber quantity of 0.4 wt % did not in general lead to any improvement over the comparative test-piece article having a measured impact strength of 1.98 mJ/mm$^2$ for the short fibers at 5 mm, while the 10 mm fibers usually led to defective specimens due to excessive viscosity, and with the 20 mm fibers there was no longer any processability.

Figure 4:
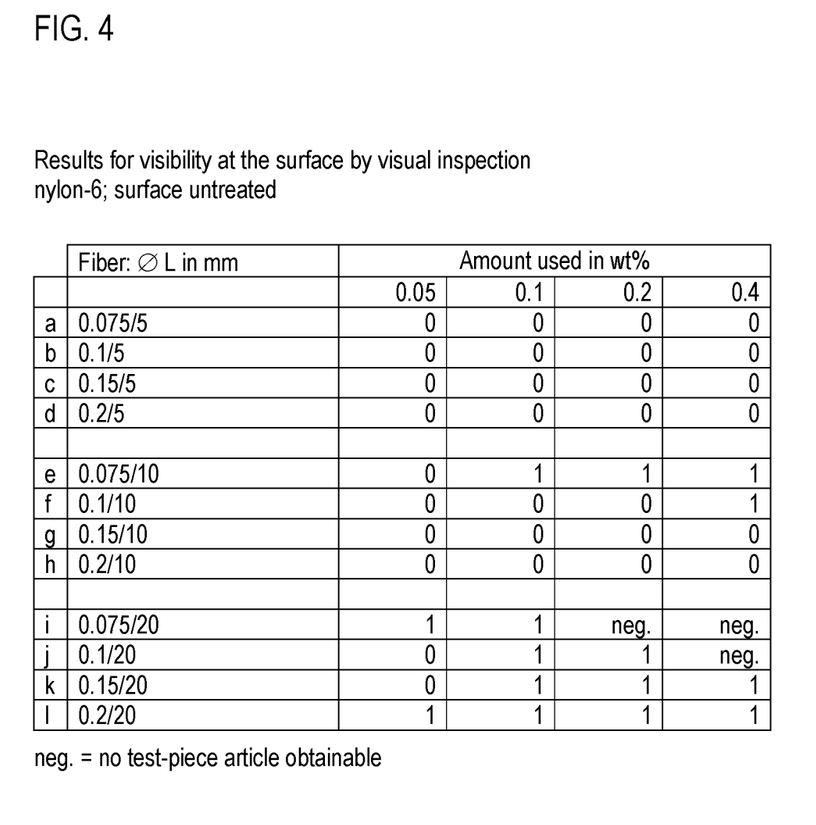
FIG. 4 shows a table featuring results of a visual inspection of the visible surface of the test-piece articles according to the above tables of FIG. 3.

FIG. 4 shows a table reporting data from a visual inspection of the surface of the test-piece articles which corresponds to the face side 5 on the final molded article. A "0" in this table indicates when the inspected test-piece surface was flawless, while "1" indicates that fibers were visible at the surface or the lack of processability had led to other defects such as, for example, cracks or holes.

When fibers were 10 mm in length and admixed at a high level of ≥0.1 wt %, visible defects in the form of holes or cracks developed due to excessive viscosity particularly in the case of the thinner fibers used at 0.075 mm in diameter.

As expected, casting compositions comprising fibers 20 mm in length were in some instances no longer processable (high viscosity and entanglement) in the case of thin fibers and a high amount used, and/or gave rise to defects on the visible surfaces of the specimens.

A comparison with FIG. 3 and the impact strength measurements shows that, when untreated fibers are used, it should be preferable to admix fibers 10 mm in length and between 0.075 and 0.15 mm in diameter at an admixture rate of 0.05-0.2 wt %. Particularly the test-piece articles e and f exhibited in some instances marked improvements in impact strength measurements.

Fibers having a length of 20 mm can also be admixed, albeit only at a low rate of 0.05 wt % if there are to be no visible defects on the visible surface.

FIG. 5 shows a corresponding table, again featuring the test-piece articles a-e although this time, as already described, admixed with fibers surface activated via a plasma. The fibers admixed, as already described, again varied in length and diameter, and the amounts used also varied as already described with regard to FIG. 3. The comparative test-piece article corresponds to that of FIG. 3, since the same casting compound was used, and it gave an impact strength value of 1.98 mJ/mm$^2$.

As can be seen, even test-piece articles a-d exhibit significant increases in impact strength measurements, particularly at the admixture amounts of 0.05, 0.1 and 0.2 wt %, the maximum value here being 2.4 mJ/mm$^2$ in the case of test-piece article c at a fiber quantity of 0.1 wt %. It is again observed that, depending on the test-piece article, the impact strength measurements will in some instances go back down as the fiber quantity increases. The explanation for this effect is that as fiber length decreases and fiber cross section increases, the dislocatory action of the fibers in the composite increases faster with the increasing fiber content than the forces of adherence do.

The increase in the impact strength measurements is even more significant with test-piece articles e-h. Test-piece article f here exhibited the highest impact strength value of 3.05 mJ/mm$^2$ at a fiber quantity of 0.4 wt %. Overall, however, test-piece articles e-h are all found to exhibit distinctly higher impact strength measurements than the comparative test-piece article.

This also applies to test-piece articles i-l. They likewise exhibit significant increases in impact strength measurements.

The explanation for the distinct improvement in impact strength measurements, including with regard to the FIG. 3 measurements for untreated fibers, is that the plasma activation of the surface has given rise to reactive groups there which lead to a distinctly stronger bond of the fibers to the binder matrix; that is, the reactive groups of the fiber surface have formed a bond with the binder.

FIG. 6 shows the results of a visual examination of the surface of test-piece articles a-l as per FIG. 5. These results correspond to those already apparent from FIG. 4. It transpires that as fiber length, the diameter and the amount admixed all increase, the number of test-piece articles where there were visible defects in the face side also increases. A comparison with FIG. 5 shows that it is therefore particularly the test-piece articles f and g with add amounts of 0.05, 0.1 and 0.2 wt % that are useful for providing outstanding results not only with regard to improved impact strength but also with regard to the possibility of producing an impeccable face side. They deliver distinctly increased impact strength values in some cases.

Even fibers having a length of 20 mm have proved to be perfectly usable not only with regard to an improved impact strength but also with regard to the production of a visually impeccable face side. This only at relatively low admixtures, however.

FIG. 7 finally shows a table reporting rounded rheology measurements regarding the different casting compositions. The reported measurements indicate the dynamic viscosity. For each casting composition a-l comprising untreated nylon-6 fibers (i.e., in accordance with FIG. 3), 160 ml of casting composition were tested. The rheology measurement was carried out in accordance with DIN EN ISO 3219 by using an R/S Rheometer SST dynamic viscometer from Brookfield. The reported measurements are in mPas. The measured rheology value is obtained from three measured ranges at a rotation of 10 l/min. The measured values are determined from the second measured interval, and the intervals reside in a time range of 40-50 seconds, 80-90 seconds and 120-130 seconds.

The comparative casting composition sans admixed fiber gave a dynamic viscosity of 5500 mPas. Casting compositions having distinctly different viscosities are also workable, but it transpired on corresponding admixture of fibers that the viscosity increase resulting therefrom will again, from a certain value onward, lead to the aforementioned defects in the surface and/or an end to the processability of the composition.

The table reveals that for virtually every casting composition tested, the dynamic viscosity increases with increasing fiber quantity. It is further apparent that the dynamic viscosity decreases with increasing fiber diameter for the same amount of fiber admixed. This is because total fiber surface area decreases with increasing fiber diameter for the same amount of fiber admixed, and this has a positive effect on the viscosity value.

From a manufacturing viewpoint, a casting compound whose viscosity has doubled or more as a consequence of fiber admixture, as compared with the viscosity of the casting compound sans fiber admixture, turned out to be no longer workable. Having regard to the results of the visual inspection as per FIGS. 4 and 6, it transpires that, again, particularly the test-piece articles f and g and admixtures of 0.05, 0.1 and 0.2 wt % still exhibit sufficiently good viscosity values to permit the production of test-piece articles and hence cast-molded articles having not only a distinctly improved impact strength but also visually impeccable face areas. Within the group of test-piece articles comprising fibers 20 mm in length, it is only the casting compositions j and k at admixed fiber quantities of 0.05 wt % which permit a technically impeccable process for producing test-piece articles of improved impact strength and hence of cast-molded articles having a visible surface that is impeccable.

The rheology measurements regarding casting compounds a-l comprising the plasma-treated fibers of FIG. 5 are not presented separately because they correspond to those in FIG. 7.

The measured results show overall that it is preferably fibers that have been surface activated, in particular by a plasma treatment, which deliver particularly distinct improvements in the impact strength of a cast-molded article. With regard to the production of a visually impeccable face area and the possibility of maintaining adequate viscosity for the casting compound for straightforward processing despite fiber admixture, fibers having an average length of about 7-15 mm, in particular 8-12 mm and more preferably of 10 mm should be used, while the fiber diameter should be between 0.075 and 0.175 mm, preferably between 0.1-0.15 mm.

Since, in impeccable cast-molded articles, the fibers cannot be seen at the surface, they logically do not affect the mechanical properties of the surface and visible area; that is, these continue to exhibit the high level of scratch resistance as conferred particularly by the casting composition batch underlying the test-piece articles.

Particular preference is given to producing cast-molded articles from binder batches as described in DE 10 2004 055 365 A1 or DE 10 2010 046 627 A1, which with regard to the binder solutions/casting compositions described therein are hereby fully incorporated in the disclosure of the present application by reference. That is, all the features disclosed therein fully form part of the disclosure of the present application.

While specific embodiments of the invention have been shown and described in detail to illustrate the inventive principles, it will be understood that the invention may be embodied otherwise without departing from such principles.

We claim:

1. A cast-molded article made of a composite material comprising a cured polymeric binder incorporating embedded particles of filler, wherein the binder incorporates randomly distributed fibers of polyamide, wherein the fibers have a length of 5-20 mm and a diameter of 0.05-0.2 mm and the fibers are present in an amount of 0.02-0.5 wt % based on the overall mass of the cast-molded article, wherein the fibers have a main alignment essentially parallel to the face side of the cast-molded article.

2. The cast-molded article according to claim 1, wherein the fibers are of nylon-6 or nylon-6,6.

3. The cast-molded article according to claim 1, wherein the fibers have a length of 5-15 mm.

4. The cast-molded article according to claim 1, wherein the fibers have a diameter of 0.075-0.175 mm.

5. The cast-molded article according to claim 1, wherein the fibers comprise 0.025-0.25 wt % based on the overall mass of the cast-molded article.

6. The cast-molded article according to claim 1, wherein the fibers have a breaking strength of not less than 250 $N/mm^2$.

7. The cast-molded article according to claim 1, wherein the fibers are colorless or match the color of the cast-molded article.

8. The cast-molded article according to claim 1, wherein an edge region adjoining the face side of the cast-molded article is fiberless and it is only in the remaining volume of the article that the fibers are present in the form of a dispersion.

9. The cast-molded article according to claim 1, wherein the fibers form a homogeneous distribution away from any edge region.

10. The cast-molded article according to claim 1, wherein the fibers attach to the binder via surficial reactive groups.

11. The cast-molded article according to claim 1, wherein the fibers have a coating of adhesion promoter attaching them to the binder.

12. The cast-molded article according to claim 1, wherein the binder comprises a monomer and a polymer dissolved in the monomer.

13. The cast-molded article according to claim 12, wherein the monomer is methyl methacrylate and the polymer is poly(methyl methacrylate).

14. The cast-molded article according to claim 13, wherein the binder comprises a crosslinker.

15. The cast-molded article according to claim 14, wherein the crosslinker is trimethylolpropane trimethacrylate.

16. The cast-molded article according to claim 1, wherein the mass fraction of the filler particles is between 40-85% based on the mass of the cast-molded article.

17. The cast-molded article according to claim 1, wherein it contains inorganic types of filler particles.

18. The cast-molded article according to claim 1, wherein the filler particles are each between 0.01 mm and 2 mm in size.

19. The cast-molded article according to claim 18, wherein filler particles in two or more different size fractions are present.

20. The cast-molded article according to claim 1, wherein it is a sink, a wash-basin, a shower tray or a worktop.

21. A process for producing a cast-molded article according to claim 1, wherein not only filler particles but also polyamide fibers having a length of 5-20 mm and a diameter of 0.05-0.2 mm are mixed into a curable polymeric solution of a binder to form a homogeneous casting composition wherein the fibers comprise 0.02-0.5 wt % based on the overall mass of the casting composition and then the casting composition is poured into a casting mold wherefrom the cast-molded article is demolded after the binder has cured.

22. The process according to claim 21, wherein fibers of nylon-6 or nylon-6,6 are used.

23. The process according to claim 21, wherein fibers having a length of 5-15 mm and/or having a diameter or 0.075-0.175 mm are used.

24. The process according to claim 21, wherein the admixed proportion of fibers comprises 0.025-0.25 wt based on the overall mass of the casting composition.

25. The process according to claim 21, wherein fibers having a breaking strength of not less than 250 N/mm$^2$ are used.

26. The process according to claim 21, wherein the fibers used are colorless or match the color of the cast-molded article.

27. The process according to claim 21, wherein the fibers used have been plasma treated on the surface to form reactive groups or in that the fibers have a coating of adhesion promoter.

28. The process according to claim 21, wherein the binder used comprises a monomer, a polymer dissolved in the monomer and optionally a crosslinker.

29. The process according to claim 28, wherein the monomer used is methyl methacrylate, the polymer used is poly(methyl methacrylate) and optionally trimethylolpropane trimethacrylate is used as crosslinker.

30. The cast-molded article according to claim 3, wherein the fibers have a length of 8-12 mm.

31. The cast-molded article according to claim 30, wherein the fibers have a length of 10 mm.

32. The cast-molded article according to claim 4, wherein the fibers have a diameter of 0.1-0.15 mm.

33. The cast-molded article according to claim 5, wherein the fibers comprise 0.03-0.2 wt % based on the overall mass of the cast-molded article.

34. The cast-molded article according to claim 33, wherein the fibers comprise 0.05-0.15 wt % based on the overall mass of the cast-molded article.

35. The cast-molded article according to claim 16, wherein the mass fraction of the filler particles is between 60-80% based on the mass of the cast-molded article.

36. The cast-molded article according to claim 35, wherein the mass fraction of the filler particles is between 65-75% based on the mass of the cast-molded article.

37. The cast-molded article according to claim 17, wherein it contains quartz sand, quartz meal, silicon dioxide, silicon carbide, glass, alumina or calcium carbonate.

38. The process according to claim 23, wherein fibers having a length of 8-12 mm are used.

39. The process according to claim 38, wherein fibers having a length of 10 mm are used.

40. The process according to claim 23, wherein fibers having a diameter of 0.1-0.15 mm are used.

41. The process according to claim 24, wherein the admixed proportion of fibers comprises 0.03-0.2 wt % based on the overall mass of the casting composition.

42. The process according to claim 41, wherein the admixed proportion of fibers comprises 0.05-0.15 wt % based on the overall mass of the casting composition.

43. A cast-molded article made of a composite material comprising a cured polymeric binder incorporating embedded particles of filler, wherein the binder incorporates randomly distributed fibers of polyamide, wherein the fibers have a length of 5-20 mm and a diameter of 0.05-0.2 mm and the fibers are present in an amount of 0.02-0.5 wt % based on the overall mass of the cast-molded article, wherein the fibers are colorless or match the color of the cast-molded article.

44. A cast-molded article made of a composite material comprising a cured polymeric binder incorporating embedded particles of filler, wherein the binder incorporates randomly distributed fibers of polyamide, wherein the fibers have a length of 5-20 mm and a diameter of 0.05-0.2 mm and the fibers are present in an amount of 0.02-0.5 wt % based on the overall mass of the cast-molded article, wherein an edge region adjoining the face side of the cast-molded article is fiberless and it is only in the remaining volume of the article that the fibers are present in the form of a dispersion.

* * * * *